Nov. 17, 1970 E. G. SCHICKEDANZ 3,540,977
SELF-ADHERING FOAM COMPOSITION
Filed Feb. 29, 1968
2 Sheets-Sheet 1
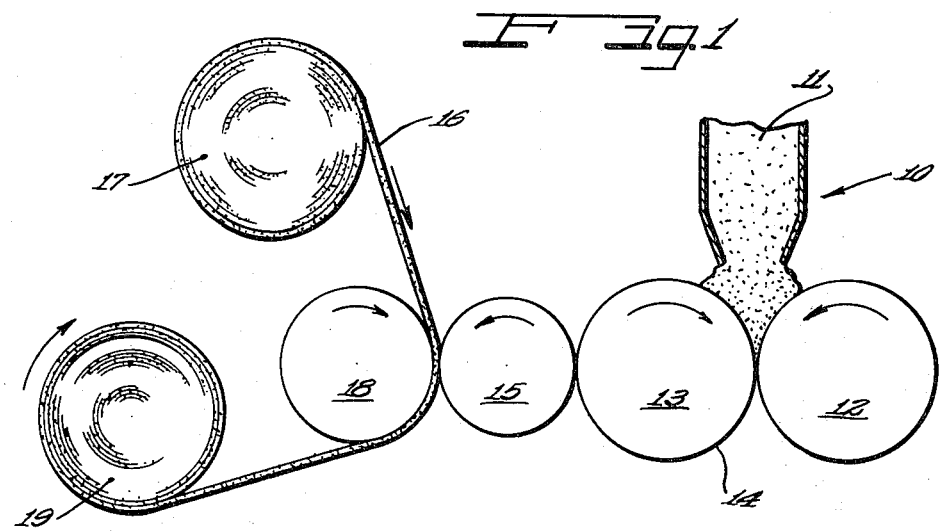
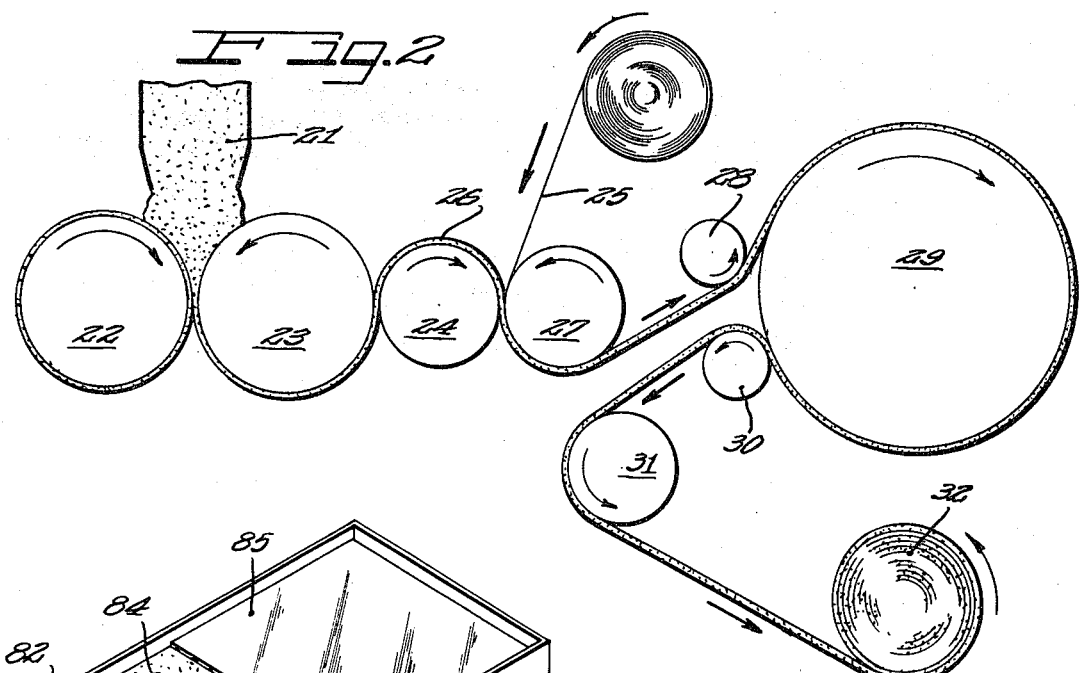
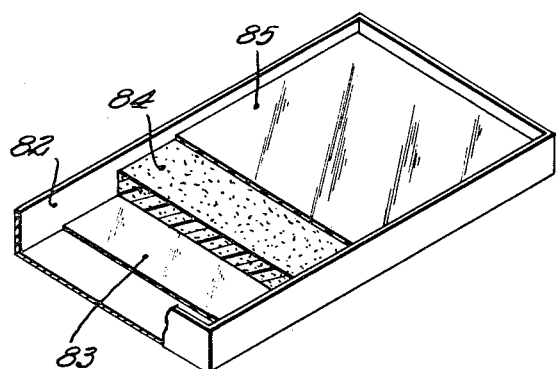
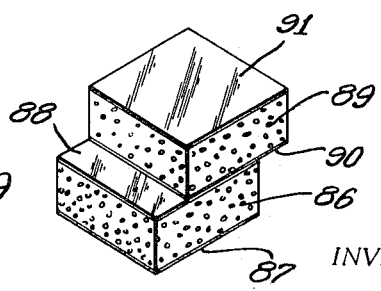
INVENTOR.
*Erich G. Schickedanz*
BY *Hill, Sherman, Meroni, Gross & Simpson*
ATTORNEYS

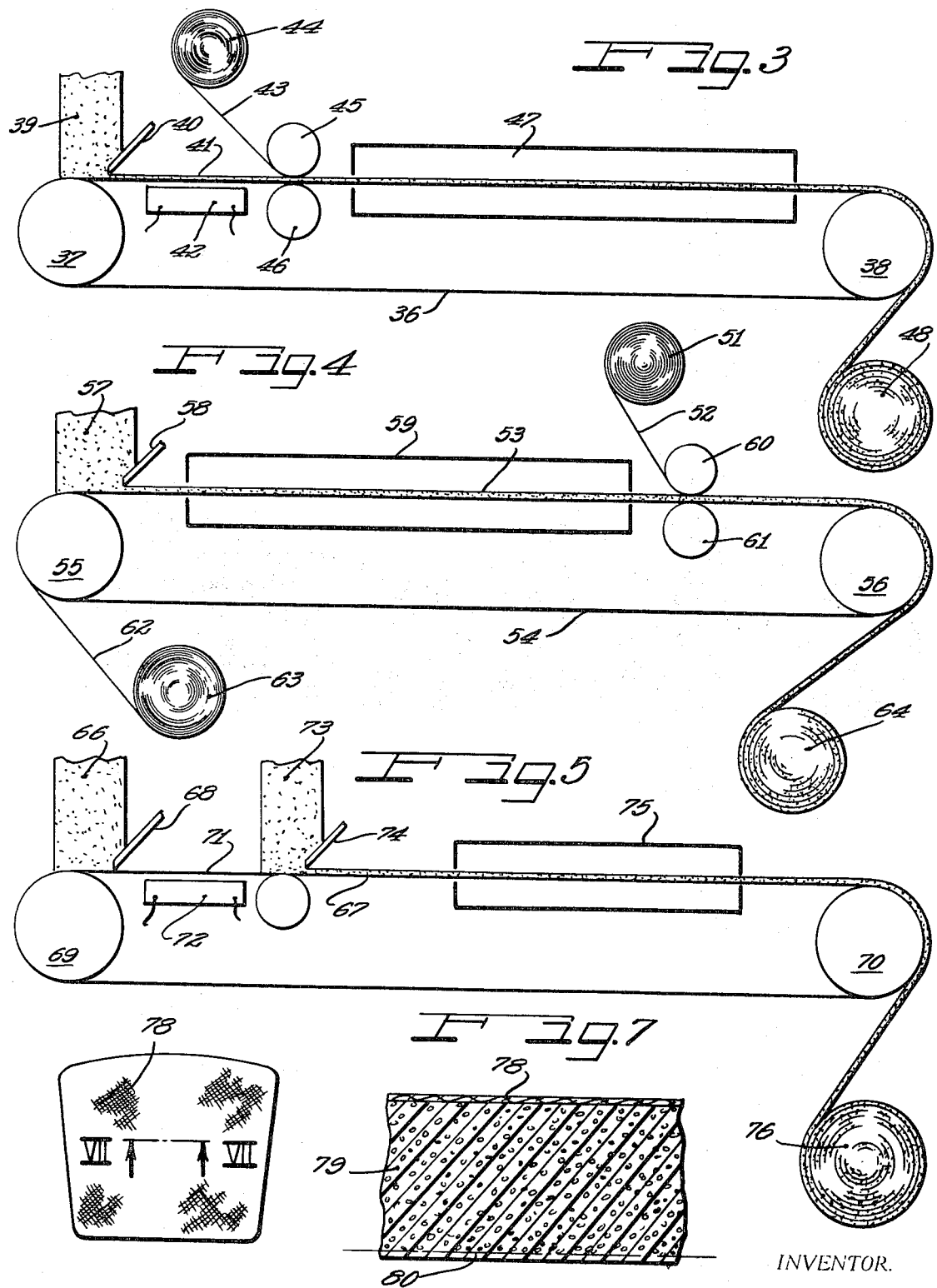

3,540,977
SELF-ADHERING FOAM COMPOSITION

Erich G. Schickedanz, Altenstadt, Germany, assignor to The Scholl Mfg. Co., Inc., Chicago, Ill., a corporation of New York
Filed Feb. 29, 1968, Ser. No. 709,421
Int. Cl. B32b 3/26, 7/02
U.S. Cl. 161—160            11 Claims

ABSTRACT OF THE DISCLOSURE

Foam structures with thin films thereon integral therewith or laminated thereto, the films having the property of adhering to smooth surfaces and being substantially non-adherent to rougher surfaces, the film being a resilient material having a mirror-like finish and having a Shore hardness in the range from about 10 to 60.

BACKGROUND OF THE INVENTION

Field of the invention

The invention is in the field of foam compositions consisting of a body of foam, natural or synthetic, having a very thin film of a flexible, soft adhesion agent thereon to promote adherence of the foam structure to extremely smooth surfaces.

DESCRIPTION OF THE PRIOR ART

Historically, the art of adhesives making use of a layer of an adhesive material is extremely old. Generally speaking, however, the best adhesives are relatively expensive and are sometimes difficult to apply. In most cases, these adhesives have to be provided with a cover layer which is removed prior to application of the adhesive surface to the object of which it is to be joined. Furthermore, such adhesive surfaces frequently leave residues when disbonded from the surface.

SUMMARY OF THE INVENTION

The present invention provides a foam structure having at least one surface which is adherent to smooth surfaces and is substantially non-adherent to rougher surfaces, the foam structure including a body of flexible foam having at least one surface composed of a thin film of resilient material having a mirror-like finish and having a Shore hardness in the range of from 10 to 60.

BRIEF DESCRIPTION OF THE DRAWINGS

FIG. 1 is a schematic view of one form of apparatus for producing the article of the present invention;

FIG. 2 is a schematic representation of another form of apparatus which can be used;

FIG. 3 is a schematic view of a further modified form of the apparatus using a conveyor belt;

FIG. 4 is a schematic view of a modified form of the apparatus as shown in FIG. 3;

FIG. 5 is a still further modified form of apparatus which can be used;

FIG. 6 is a plan view of a seat cushion embodying the structure of the present invention;

FIG. 7 is a greatly enlarged cross-sectional view taken substantially along the line VII—VII of FIG. 6;

FIG. 8 is a view of a tray structure employing the structure of the present invention, partly broken away to illustrate the structure more completely; and FIG. 9 is a view in perspective of a pair of building blocks provided with the improved foam structure of the present invention.

DESCRIPTION OF THE PREFERRED EMBODIMENTS

The foam structures of the present invention include a body of a foam, natural or synthetic, having a thin film of a flexible adhesion promoting material on at least one surface thereof, the film being either an integral part of the foam or consisting of a chemically distinct material laminated to the foam. No extraneous adhesives are used, and the adhesive effect comes from the molecular forces occurring between two smooth surfaces, the film itself having a mirror-like finish. Consequently, when the mirror-like finish of the foam is pressed against another smooth surface, the extremely thin layer of air, normally existing at the surfaces, is forced out and the two articles cling together. In some respects, the action is similar to the gauge blocks used in industry as precise measuring devices.

Any natural or synthetic foam can be used for the purpose of the present invention, including materials such as foam rubber, polyurethane foams of both the ester and ether type, polyvinyl chloride foam and other synthetic resinous materials. The invention is also applicable to porous mats produced from non-woven fibers.

The mirror-like surface cannot be defined with any great degree of accuracy, but usually the surface will have a root mean square deviation from the perfect plane by no more than about 0.0001 millimeter. However, greater degrees of deviation can be tolerated where the material used has a low Shore hardness.

The thin film which exhibits the mirror-like finish can be formed integrally with the foam by suitably casting the foam against an extremely smooth polished surface, or a film measuring 1 millimeter or less can be laminated thereto, the film having the required mirror-like finish on its outer surface. The material of the film can be any flexible resin, thermoplastic or thermosetting, which can be pressed against a very smooth surface and provide the requisite mirror-like finish. Typical among the film materials are polyvinyl chloride, particularly in the form of a plastisol, polyacryl resins, polymethacrylic resins, polyolefinic resins such as polyisobutylene, and the like.

Turning now to a description of the drawings, in FIG. 1 the reference numeral 10 indicates a hopper which feeds a heat gellable polyvinyl chloride plastisol 11 between a pair of heated rolls 12 and 13. The temperature at the rolls is approximately 160 to 180° C., sufficient to melt the plastisol composition and form a thin film 14 on the surface of the rolls. The thickness of the film has been exaggerated for purposes of illustration. Generally, the thickness will be substantially less than 1 millimeter, on the order of $\frac{1}{10}$ to $\frac{2}{10}$ millimeter.

The film 14 then passes over a highly polished roll 15 where it receives the mirror-like finish. This roll is also heated to about 160° C. The treated film is then laminated to a web of plastic foam 16 which travels from a supply reel 17 about the periphery of a cooled roll 18 and then onto a take-up roll 19. Lamination of the thin film 14 to the plastic foam 16 takes place while the other two are being joined at the surface of the cooled roll 18.

In FIG. 2, a foamable rubber composition 21 is plasticized by passage between a pair of heated rolls 22 and 23. The thin film resulting then passes over a highly polished roll 24. A laminating film 25 is applied to the opposite surface of the foamed rubber sheet 26 which received the mirror-like coating from the roll 24. Preferably, the laminated sheet 25 is an extremely thin plastic film which itself has been provided with a mirror-like finish on one surface so that the resulting article will have the required adhesive characteristic on both outer surfaces, one resulting from the in situ production of the mirror-like surface on one side of the sheet 26 and the other coming from the mirror-like surface on the laminated sheet 25. The laminated sheet 25 is united to the foam rubber sheet 26 at a pressure roll 27. The resulting laminate passes under a guide roll 28 or over a heated vulcanizing drum 29, over a second guide roll 30 and then onto a cooling drum 31 before it is wound up on a takeup roll 32.

In the embodiment of the invention illustrated in FIG. 3, a continuous belt 36 composed of a highly polished material such as steel or aluminum is formed in an endless loop between a pair of rolls 37 and 38. A foamable resin composition 39 is applied as a thin layer onto the belt 36 by means of a doctor blade 40. The thickness of the deposited layer has been exaggerated for purposes of clarity, as it will normally be on the order of 1/10 of a millimeter. The deposited layer 41 may be pre-dried or pre-gelled by means of a heater 42. A laminating sheet 43 having one surface provided with a mirror-like finish is unwound from a supply reel 44 and is laminated to the film 41 by means of a pair of laminating rollers 45 and 46 disposed on opposite sides of the belt 36. The resulting laminate then passes through a heating tunnel 47 where the deposit may be dried, vulcanized or gelled, depending upon the nature of the composition 39. The completed laminate, after suitable cooling, if necessary, is then wound up on takeup reel 48.

The assembly shown in FIG. 4 is particularly suitable for use with temperature sensitive material such as nylon and non-woven materials. A supply reel 51 supplies a sheet 52 of the temperature sensitive material onto a tacky sheet 53 of foam material traveling on an endless conveyor belt 54 extending between opposed rolls 55 and 56. The foam is delivered to the conveyor belt 54 from a supply 57 and is applied in a suitably thin film by means of a doctor blade 58. The film 53 then passes through a heating tunnel 59 before it is laminated to the sheet 52 by means of laminating rolls 60 and 61.

A temperature resistant paper sheet 62, having a mirror-like finish on one surface is unwound from a supply reel 63 and forms the base upon which the film 53 is received. The entire laminate can then be wound up on a takeup reel 64.

In the structure shown in FIG. 5, a suitable mixture 66 of polyvinyl chloride or the like is deposited as a very thin film on a highly polished conveyor belt 67 by the action of a doctor blade 68. The conveyor belt 67 extends between a pair of rolls 69 and 70. The thin polyvinyl chloride layer 71 is gelled by means of a heater 72 disposed beneath the upper run of the belt 67.

A foamable polyvinyl chloride mixture 72 is applied by means of a doctor blade 74 on top of the previously deposited thin film 71. The resulting laminate then passes into a heating tunnel 75 where the polyvinyl plastisol mixture 66 is gelled, and the foamable composition 73 is foamed. Finally, the resulting cured laminate after suitable cooling is wound up on a takeup roll 76.

One of the many applications of the foam structure of the present invention is that illustrated in FIGS. 6 and 7 of the drawings, a non-slip, self-adhering seat cushion. The cushion contains an upper fabric surface 78 which is secured to a body of foam 79 having an integral film 80 on the opposite surface thereof with the mirror-like finish having a Shore hardness of from 10 to 60, and preferably in the range from 30 to 40. Cushions equipped with layers of this type can, if necessary, be cleaned without their adhesive capacity being lost. In a similar way, upholstery strips provided with this type of structure can be applied to the back or the arms of chairs, provided there is a smooth surface to which the film 80 can adhere.

Another interesting application for the foam structure of the present invention is a non-skid tray of the type illustrated in FIG. 8 of the drawings suitable for holding drinking glasses aboard aircraft, boats or camping trailers. The outer tray consists of a container 82 composed of glass or a smooth surfaced plastic material. A composite foam structure, consisting of a film 83 having a suitable softness and mirror-like finish is pressed against the base of the tray 82 and adheres thereto. The film 83 is laminated to a body 84 of a suitable foam material, to which there is also laminated a second film 85. This latter film has an exterior mirror-like finish and is composed of a material of suitable softness so that it forms an adhesive surface for the bottom of a drinking glass or other smooth surfaced article.

Another embodiment of the invention is illustrated in FIG. 9 which shows the invention being applied to the field of structure elements which may be used as toys, models or for decorative purposes. Two such blocks are shown adhered to each other in staggered relation. The lower block consists of a foam body 86 having a lower adhesion promoting film 87 and an upper adhesion promoting film 88, both being composed of a material having a Shore hardness preferably of from 30 to 50 and both having a mirror-like outer finish. The lower block is shown adhesively secured by virtue of its natural adhesive properties to a block consisting of a body of foam 89 having a lower adhesion promoting film 90 secured to the film 88, and an upper film 91 of mirror-like properties and with a suitable softness to be self-adherent to a film of similar nature.

Besides the applications for the improved foam materials illustrated specifically in the drawings, there are numerous other fields in which these structures are useful. For example, they can be used as non-slip floor mats, shoe inserts, heel cushions, educational devices, model building and weather strips.

The following examples illustrate specific formulas which can be used for the purposes of the present invention.

EXAMPLE 1

The following composition can be used to produce a soft polyvinyl chloride film:

| | Parts by weight |
|---|---|
| Polyvinyl chloride | 40 |
| Dibutyl phthalate | 58 |
| Barium-cadmium stabilizer | 2 |

This plastisol can be brushed onto a highly polished surface or sprayed or applied by roller to such a surface.

EXAMPLE 2

The following composition can be used to produce a rubber-type film:

| | Parts by weight |
|---|---|
| Rubber latex (60%) | 160 |
| Colloidal sulfur | 0.5 |
| Zinc oxide | 1 |
| Zinc diethyl dithiocarbamate | 0.8 |
| Water | 2 |
| Ammonia | 1 |

This material can also be given a mirror-like finish by application to a highly polished surface, followed by drying and vulcanization.

EXAMPLE 3

The following mixture is suitable for spreading and calandering as in the form shown in FIG. 3:

| | Parts by weight |
|---|---|
| Polyvinyl chloride | 40 |
| Dioctyl phthalate | 35 |
| Butyl oleate | 3 |
| Barium-cadmium stabilizer | 2 |

EXAMPLE 4

The following mix can be compounded on a rubber mill and used in the type of assembly shown in FIG. 2:

| | Parts by weight |
|---|---|
| Rubber | 70 |
| Mineral oil | 20 |
| Stearic acid | 4 |
| Sulfur | 2 |
| Mercaptobenzothiazole | 1 |
| Zinc oxide | 3 |

EXAMPLE 5

The following latex mix can be used on the type of apparatus shown in FIG. 1:

| | Parts by weight |
|---|---|
| Rubber latex (60%) | 160 |
| Sulfur | 1 |
| Zinc oxide | 2 |
| Zinc diethyldithiocarbamate | 1 |
| Di-betanaphthyl-p-phenylenediamine | 1 |
| Casein solution (10%) | 10 |

EXAMPLE 6

The following formulation is for a blowing mix which can be used in the apparatus of FIG. 3:

| | Parts by weight |
|---|---|
| Polyvinyl chloride | 50 |
| Dioctyl phthalate | 50 |
| Butyl oleate | 7 |
| Azodicarbonamide | 10 |
| Barium-cadmium stabilizer | 1 |

EXAMPLE 7

The following is a formulation of a self-foaming polyvinyl chloride mixture also useful for the purposes of the present invention:

| | Parts by weight |
|---|---|
| Polyvinyl chloride | 10 |
| Butyl benzylphthalate | 40 |
| Dioctyl phthalate | 10 |
| Butyl oleate | 10 |
| Foaming agent ("Fomade") | 10 |

The Shore hardness test referred to in the foregoing is that described under ASTM designation D2240-64T.

It should be evident that various modifications can be made to the described embodiments without departing from the scope of the present invention.

I claim as my invention:

1. A polymeric foam structure having at least one surface which is adherent to smooth surfaces and substantially non-adherent to rougher surfaces comprising a body of flexible polymeric foam having at least one surface composed of a thin film of resilient material having a mirror-like finish and having a Shore hardness in the range from 10 to 60.

2. A foam structure according to claim 1 wherein the Shore hardness is in the range from 30 to 40.

3. The foam structure of claim 1 in which said foam is a synthetic resin foam.

4. The foam structure of claim 1 in which said foam is a polyurethane foam.

5. The foam structure of claim 1 in which said foam is a polyvinyl chloride foam.

6. The foam structure of claim 1 in which said foam is foam rubber.

7. The foam structure of claim 1 in which said foam has a thickness of less than 1 millimeter.

8. The foam structure of claim 1 in which said film is integral with said body.

9. The foam structure of claim 1 in which said film is laminated onto said body.

10. The foam structure of claim 1 in which said film is a polyvinyl chloride plastisol.

11. A seat cushion having the foam structure of claim 1.

References Cited

UNITED STATES PATENTS

| 3,160,549 | 12/1964 | Caldwell et al. | 161—161 |
| 3,223,576 | 12/1965 | Evans et al. | 161—159 |

WILLIAM J. VAN BALEN, Primary Examiner

U.S. Cl. X.R.

161—161, 164, 165, 190, 247

UNITED STATES PATENT OFFICE
CERTIFICATE OF CORRECTION

Patent No. 3,540,977          Dated November 17, 1970

Inventor(s) Erich G. Schickedanz

It is certified that error appears in the above-identified patent and that said Letters Patent are hereby corrected as shown below:

Col. 3, line 61, "mixture 72" should read

--mixture 73--.

Col. 6, line 2,

"Polyvinyl chloride.....10" should read

--Polyvinyl chloride....50--.

Signed and sealed this 19th day of October 1971.

(SEAL)
Attest:

EDWARD M. FLETCHER, JR.     ROBERT GOTTSCHALK
Attesting Officer           Acting Commissioner of Patent